United States Patent
Becker et al.

(10) Patent No.: US 7,837,268 B2
(45) Date of Patent: Nov. 23, 2010

(54) HINGED MOUNTING FOR A MOTOR VEHICLE SEAT AND WITH A CIRCULAR BLANK

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 273 days.

(21) Appl. No.: 12/142,021

(22) Filed: Jun. 19, 2008

(65) Prior Publication Data
US 2008/0315656 A1 Dec. 25, 2008

(30) Foreign Application Priority Data
Jun. 20, 2007 (DE) .................. 10 2007 029 456

(51) Int. Cl.
*B60N 2/20* (2006.01)
(52) U.S. Cl. ............... 297/378.12; 297/378.14; 297/362
(58) Field of Classification Search ............ 297/362, 297/378.12, 378.14
See application file for complete search history.

(56) References Cited

U.S. PATENT DOCUMENTS

| | | | | |
|---|---|---|---|---|
| 4,147,386 A * | 4/1979 | Stolper | ............ | 297/362 |
| 5,725,452 A * | 3/1998 | Droulon et al. | ......... | 297/362 X |
| 5,820,218 A * | 10/1998 | Baloche et al. | ..... | 297/378.12 X |
| 5,893,610 A | 4/1999 | Schüler et al. | | |
| 5,984,413 A * | 11/1999 | Baloche et al. | ..... | 297/378.12 X |
| 6,033,022 A * | 3/2000 | Bauer et al. | ........... | 297/378.12 |
| 6,076,890 A * | 6/2000 | Yoshida et al. | ......... | 297/378.12 |
| 6,082,821 A * | 7/2000 | Baloche et al. | ..... | 297/378.12 X |
| 6,464,299 B1 * | 10/2002 | Castagna | .............. | 297/378.12 |
| 6,685,270 B2 * | 2/2004 | Haglund | .............. | 297/354.12 X |
| 6,857,702 B2 * | 2/2005 | Becker et al. | ............... | 297/341 |
| 6,926,362 B2 * | 8/2005 | Kroner et al. | ....... | 297/378.12 X |
| 6,968,598 B2 * | 11/2005 | Becker et al. | ........... | 297/362 X |
| 7,025,422 B2 * | 4/2006 | Fast | ..................... | 297/378.14 |
| 7,097,252 B2 * | 8/2006 | Becker et al. | .......... | 297/378.12 |
| 7,097,253 B2 * | 8/2006 | Coughlin et al. | ....... | 297/378.12 |
| 7,235,030 B2 * | 6/2007 | Becker et al. | ........... | 297/362 X |
| 7,300,109 B2 * | 11/2007 | Hofmann et al. | ........... | 297/362 |
| 7,354,108 B2 * | 4/2008 | Matsumoto et al. | ........ | 297/362 |
| 7,357,455 B2 * | 4/2008 | Becker et al. | .......... | 297/378.12 |

(Continued)

FOREIGN PATENT DOCUMENTS

DE        197 57 111 C1        11/1998

(Continued)

*Primary Examiner*—Rodney B White
(74) *Attorney, Agent, or Firm*—McCarter & English, LLP

(57) ABSTRACT

The hinged mounting for a seat back hinge of a motor vehicle seat has a first hinge arm and a second hinge arm; it further has a circular blank that is interposed between said hinge arms. The circular blank has a first circular blank plate that is connected to the first hinge arm, a second circular blank plate that is associated with the second hinge arm, a retaining means for keeping the two circular blank plates together in the axial direction and a releasable stopper device. The second circular blank plate comprises at least one retaining side. The retaining means is rigidly connected to the second circular blank plate. Between the annular region and the second circular blank plate there is formed a circumferential groove in which the first circular blank plate is retained for rotation. The retaining means stiffens the second circular blank plate.

9 Claims, 4 Drawing Sheets

U.S. PATENT DOCUMENTS

| | | | |
|---|---|---|---|
| 7,434,884 B2 * | 10/2008 | Becker et al. | 297/341 |
| 7,434,885 B2 * | 10/2008 | Becker et al. | 297/378.12 |
| 7,497,519 B2 * | 3/2009 | Dill et al. | 297/362 |
| 7,648,206 B2 * | 1/2010 | Wieclawski | 297/378.12 |

FOREIGN PATENT DOCUMENTS

| | | |
|---|---|---|
| DE | 20 2004 010 645 U1 | 9/2004 |
| DE | 10 2005 050 222 A1 | 9/2006 |
| EP | 0 844 133 B1 | 5/1998 |

* cited by examiner

HINGED MOUNTING FOR A MOTOR VEHICLE SEAT AND WITH A CIRCULAR BLANK

CROSS-REFERENCE TO RELATED APPLICATIONS

This patent application claims priority to co-pending German Patent Application DE 10 2007 029 456.7, filed Jun. 20, 2007, which is hereby expressly incorporated by reference in its entirety as part of the present disclosure.

BACKGROUND OF THE INVENTION

The invention relates to a hinged mounting for a seat back hinge of a motor vehicle seat, more specifically for a motor vehicle seat having only one door on each vehicle side, with a first hinge arm, with a second hinge arm and with a circular blank that is interposed between the first hinge arm and the second hinge arm, said circular blank comprising (a) a first circular blank plate that is connected to the first hinge arm, (b) a second circular blank plate that is associated with the second hinge arm, (c) a retaining means for keeping the two circular blank plates together in the axial direction, and (d) a releasable stopper device that is interposed between the two circular blank plates and the two hinge arms being pivotal relative to each other about an axis of rotation and the second circular blank plate comprising at least one retaining side.

Such a hinged mounting is known from DE 10 2005 050 222 A1. In principle, such type hinged mounting have proved efficient. In particular for use in motor vehicles having only one side door on each vehicle side and additional rear seats, the mounting however is not advantageous since an intermediate plate must be inserted between the second circular blank plate and the second hinge arm in order to permit fast forward tilt of the seat back as is usual for facilitating access to the rear seats. Such type vehicle seats, which may be moved forward, are known from EP 0 844 133 B1, U.S. Pat. No. 5,893,610, and DE 197 57 111 C1, for example. The document DE 20 2004 010 645 U1also shows a hinged mounting.

In principle, the hinged mounting according to DE 10 2005 050 222 A1 has proved efficient. Calculations and practical operation have shown that the retaining nose must exhibit high strength. This may be achieved using material of the appropriate strength, more specifically steel sheet of appropriate quality and/or of larger appropriate dimensions. As a result, the second circular blank plate, and the circular blank in general, involve high expense, in particular in terms of weight and manufacturing. This leads to the need of developing the prior art circular blank plate so as to obtain sufficient high strength, at limited expense as far as possible though.

Accordingly, it is the object of the invention to develop the prior art hinged mounting, in particular the circular blank described therein, in such a manner that the at least one retaining side exhibits high strength sufficient in particular also for application of the hinged mounting in an integrated seat system, with construction and material for the circular blank being retained and in any case retained unchanged as far as possible.

SUMMARY OF THE INVENTION

This object is achieved, for example, by a hinged mounting for a seat back hinge of a motor vehicle seat, for example, for a motor vehicle having only one door on each vehicle side. The mounting comprises a first hinge arm, a second hinge arm and a circular blank interposed between the first hinge arm and the second hinge arm. The circular blank includes a first circular blank plate that is connected to said first hinge arm, a second circular blank plate that is associated with said second hinge arm, a retaining means for keeping the two circular blank plates together in the axial direction, and a releasable stopper device that is interposed between the two circular blank plates. The two hinge arms are pivotal relative to each other about an axis of rotation. The second circular blank plate comprises at least one retaining side, wherein the retaining means is rigidly connected to the second circular blank plate and comprises an annular region as well as a radial nose. Between the annular region and the second circular blank plate, there is formed a circumferential groove in which there is located the first circular blank plate which is retained for rotation, and the radial nose rests with its surface on the radial projection, is rigidly connected thereto, and stiffens it.

On this hinged mounting, in particular on the circular blank, the retaining means is integrated in the strength chain. While the prior art retaining means does not participate in strengthening the second circular blank plate, in particular the at least one retaining side, the retaining means now participates in stiffening the second circular blank plate and in particular its retaining side. It is completely possible that the retaining means participates approximately to the same extent as the second circular blank plate in strengthening the retaining side and in increasing its load capacity, a participation of about twenty percent to about eighty percent related to the strength of the second circular blank plate being advantageous. The retaining means is suitably connected to the second circular blank plate, more specifically by welding, such as by laser welding, riveting, in particular by riveting in the region of the retaining nose and the radial nose, inclusive of the adjacent regions. Preferably, the transition zone between the radial nose and the annular region of the retaining means is configured sufficiently strong for the radial nose to be capable of taking forces as high as possible.

On the prior art motor vehicle seats, forward movement of the seat is enabled by tilting the seat back forward upon actuation of a corresponding release lever provided on the seat back. Through this pivotal movement, the two locking units of the longitudinal guide of the vehicle seat come free. As a result, the vehicle seat can be displaced forward in the longitudinal guide. Usually, there is also provided a memory device that makes it possible to resume the original initial state later.

The hinged mounting is particularly suited for two-door vehicles and for integrated seat systems. It needs only a few component parts, the seat back can be tilted forward quickly.

In the normal position of utilization of the seat back of the motor vehicle seat, the releasable retaining device engages the at least one retaining side. This engagement is only released when fast forward tilt of the seat back is desired. Thanks to the cutouts, the releasable retaining device may be provided radially outside of the two circular blank plates. In other words, the releasable retaining device is preferably located outside of the clamp periphery. This brings the advantage that the hinged mounting remains short in the axial direction. With a few additional component parts, the prior art hinged mounting is developed so as to be particularly suited for two-door motor vehicle seats.

Preferably, either the retaining side is a portion of a retaining nose projecting radially outward and provided on the second circular blank plate and at the same time a portion of a radial nose that projects radially outward and is provided on the retaining means or the retaining side is a portion of a retaining bight that is provided in the second circular blank plate and is a portion of a bight provided on the retaining means. The releasable retaining device is configured and provided in accordance therewith. The solution in which the retaining side is a portion of a retaining nose is preferred. In this event, the hinged mounting may be of a smaller and lighter construction.

It is preferred that the first hinge arm is connected to an underframe and that the second hinge arm is solidly connected to the seat back. When the seat back is tilted forward, the at least one retaining side remains stationary as a result thereof. The retaining device, which is configured on the second hinge arm, pivots together with the seat back. It may be controlled by an actuation lever provided on the seat back.

The stopper device is preferably configured to have stopper arms as they are known from EP 0770514 or it has a toothed wheel with an inner toothed surface in which a toothed wheel with an outer toothed surface wobbles off center. The second circular blank plate may be made from a material that is about twenty percent to about eighty percent thicker than the material of the retaining means.

Other features and advantages of the invention will become more apparent upon reviewing the appended claims and the following non restrictive description of embodiments of the invention, given by way of example only with reference to the drawings.

DETAILED DESCRIPTION OF THE INVENTION

The implementation as shown in FIGS. 1 through 5 relates to a first exemplary embodiment. FIG. 6 shows a second exemplary embodiment, with only part of the circular blank being shown. Hereinafter, substantially the first exemplary embodiment will be discussed at first.

Figure 1:
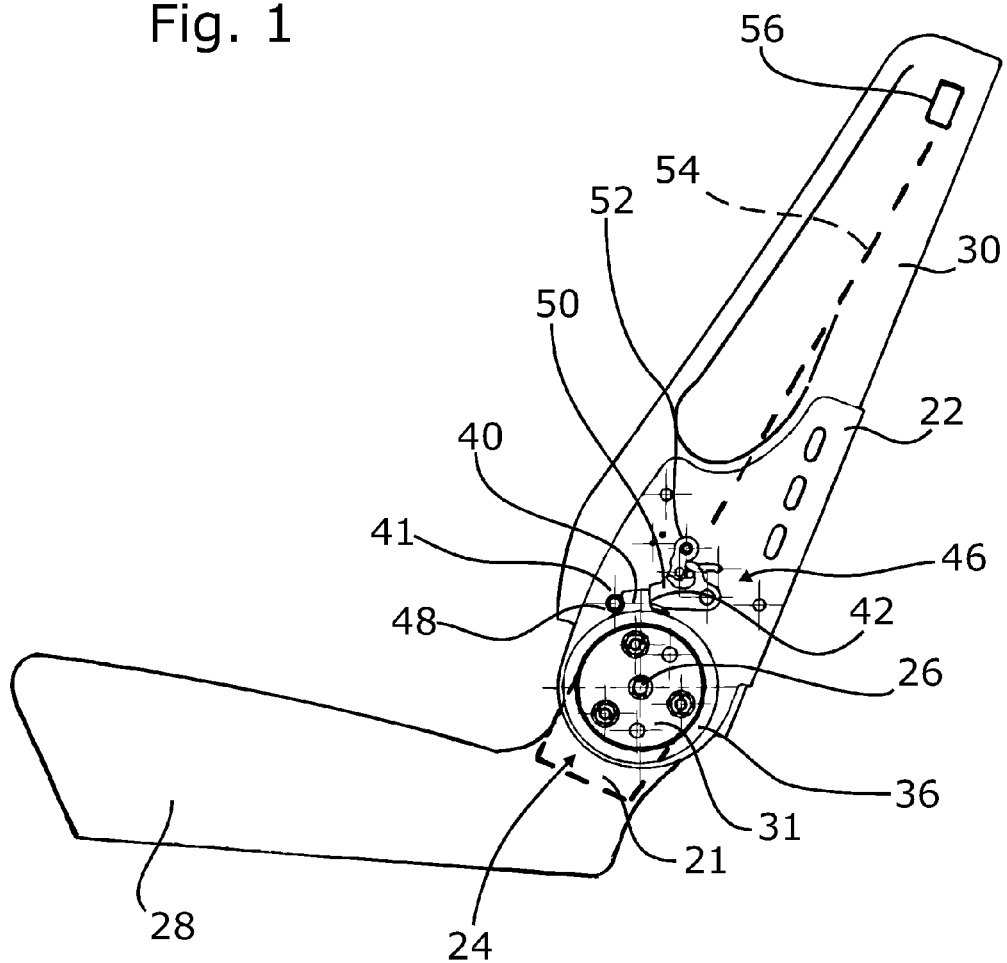
FIG. 1 is a schematic side view of a motor vehicle seat, with the seat being in the normal position of utilization.
Figure 2:
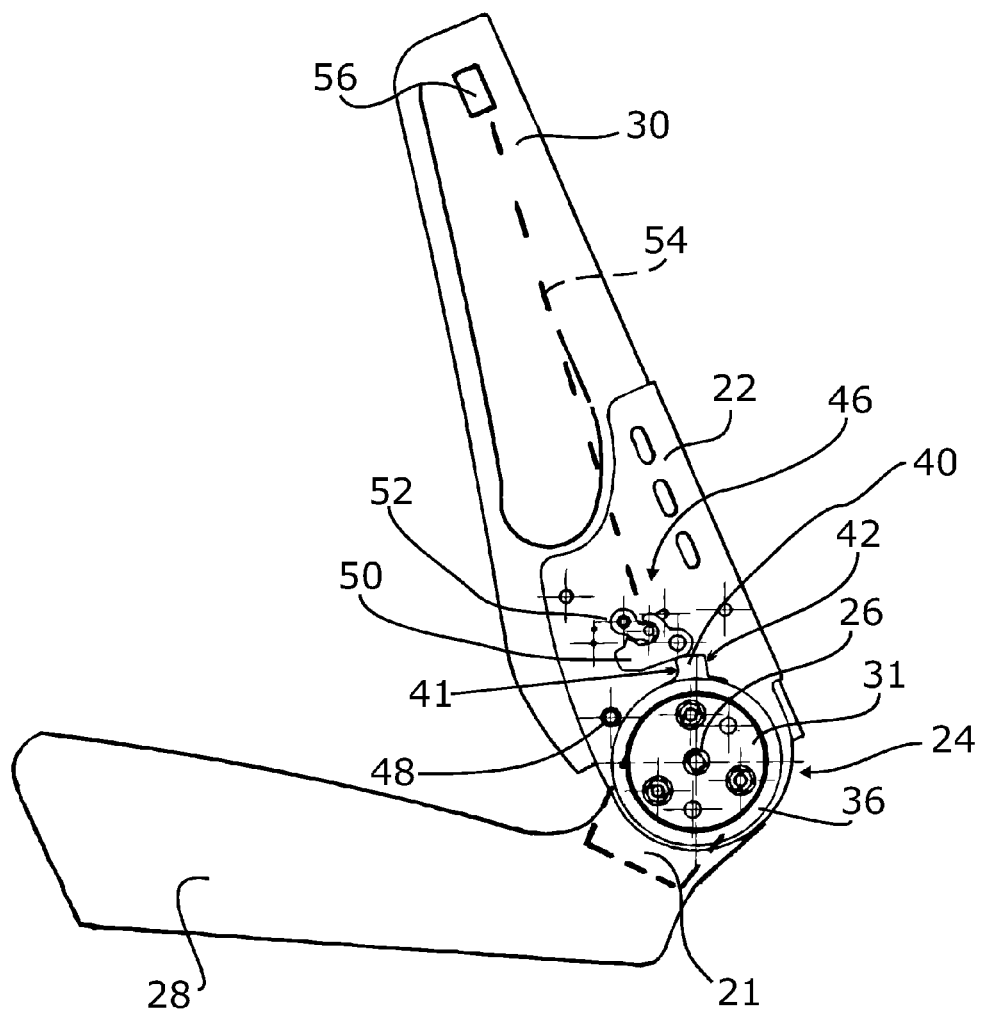
FIG. 2 is an illustration as in FIG. 1, with the seat back now being tilted forward.
Figure 3:
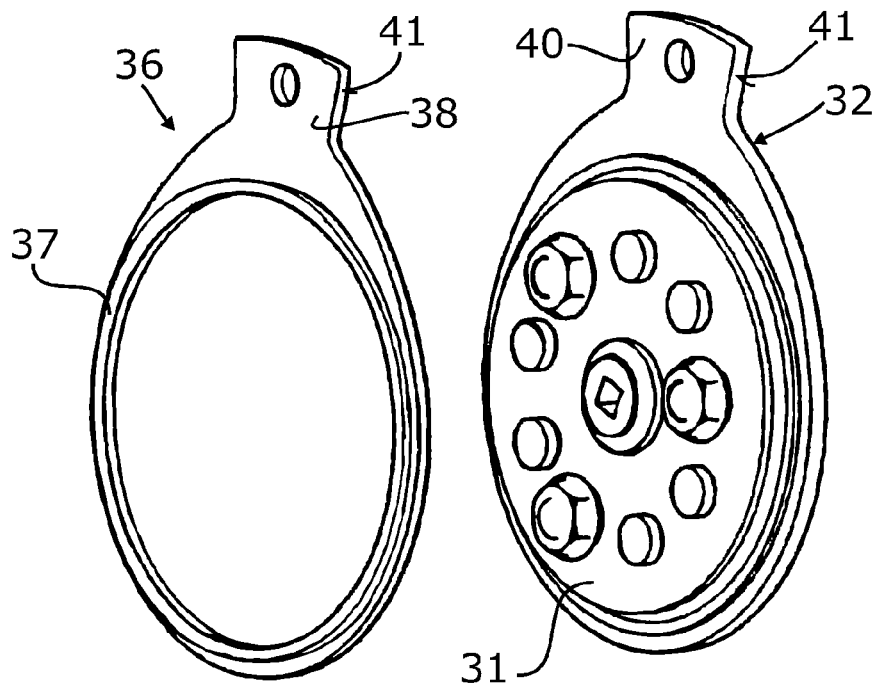
FIG. 3 is a perspective illustration in the form of an assembly drawing of the retaining means and of the two circular blank plates.

In the figures, there is shown a seat back hinge of a motor vehicle seat; it has a first hinge arm 21, a second hinge arm 22 and a circular blank 24 interposed between these two hinge arms 21, 22. The seat back hinge forms an axis of rotation 26 about which the two hinge arms 21, 22 are pivotal relative to each other. The first hinge arm 21 is connected to an underframe 28 of the vehicle seat; FIGS. 1 and 2 show a seat region of the underframe 28. The second hinge arm 22 is solidly connected to a seat back 30 of the motor vehicle seat. The circular blank 24 has a first circular blank plate 31, which is also referred to as the outer part of the mounting, and a second circular blank plate 32, which is also referred to as the inner part of the mounting. A stopper device 34 is disposed therein between for stopping the circular blank plates 31, 32 with respect to each other but also for making possible their relative adjustment. This stopper device 34 can be seen from FIG. 6 and is actually known; accordingly, it will not be discussed in closer detail herein.

The two circular blank plates 31, 32 are maintained by means of a retaining means 36. This retaining means 36 is also referred to as closure ring or jacket frame; it allows for relative rotation of the one circular blank plate 31 with respect to the other one. In the first exemplary embodiment, a retaining nose 40 projects from the second circular Blank plate 32. It has two retaining sides 41, 42 extending in radial directions which limit the retaining nose 40 in the circumferntial direction.

The retaining means 36 is composed of an annular region 37 and of a radial nose 38 that are formed as a single integral piece. Like the circular blank plates 31, 32, the retaining means 36 are made from steel sheet; it is a pressed part or a stamped part. As shown in particular in FIG. 3, the transition zone between the annular region 37 and the radial nose 38 is rounded, in any case configured for the radial nose 38 to be capable of taking forces as high as possible, in particular in the circumferential direction.

Figure 5:
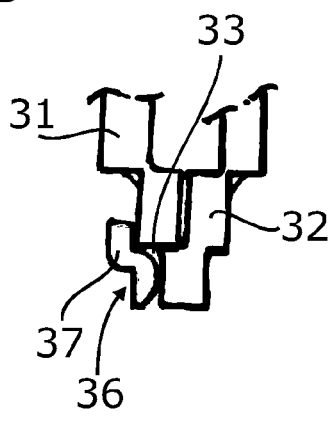
FIG. 5 is a section taken along section line V-V in FIG. 4.
Figure 6:
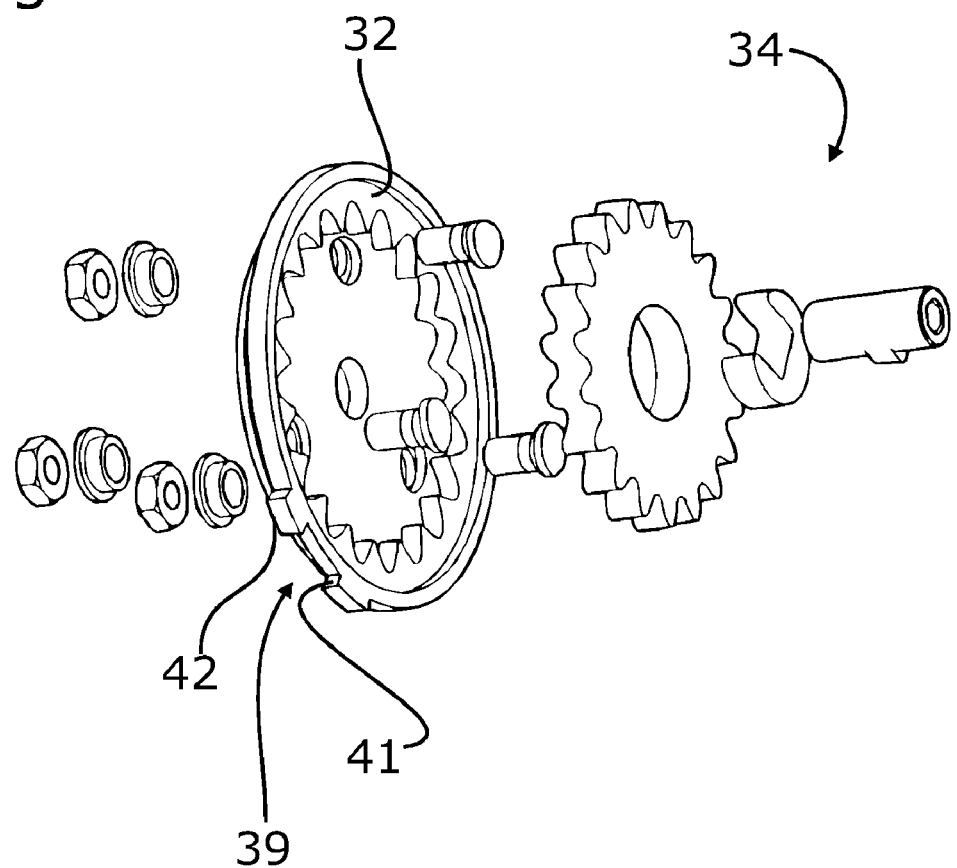
FIG. 6 is a perspective illustration of an assembly drawing of a second circular blank plate with an inner crown gear and with a stopper device with an off-center wheel.

The annular region 37 is solidly connected to the second circular blank plate 32; as best shown in FIG. 5 in particular. There, it can be seen that the annular region 37 comprises an offset, in the concrete exemplary embodiment shown it is stamped and offset approximately by its material thickness. A step is formed as a result thereof. This step is turned toward the outer edge of the first circular blank plate 31. Likewise, the second circular blank plate 32 has a step, which is also made by stamping. Between the inner surface of the second circular blank plate 32 and the inner surface of the retaining means 36 there remains a circumferential groove 33. It is a gap, which is closed toward the outside and the width of which (measured in the axial direction) is slightly larger than the material thickness of the first circular blank plate 31.

As shown in FIG. 5, the retaining means 36 has a material thickness that corresponds to about thirty percent to about eighty percent of the material thickness of the second circular blank plate 32. The two circular blank plates 31, 32 are made from a material having the same thickness.

Figure 4:
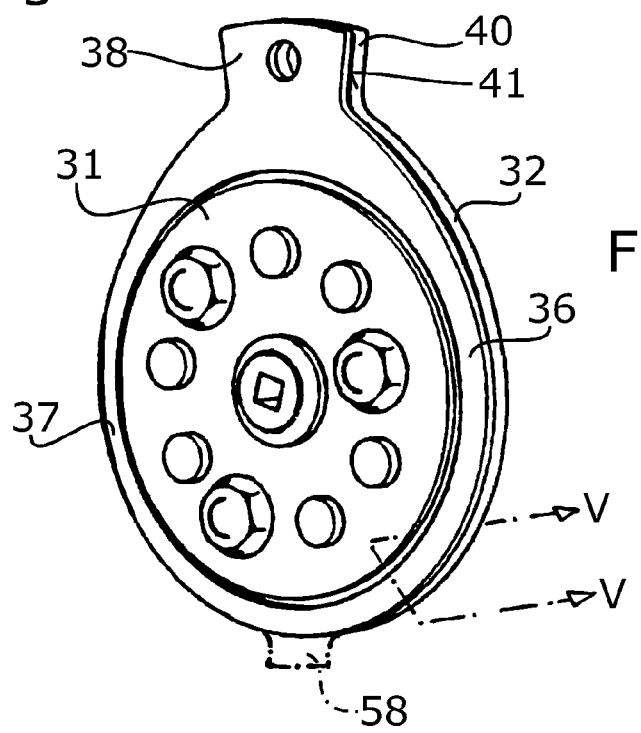
FIG. 4 is a perspective illustration of the circular blank plate in a view as shown in FIG. 3, but now assembled.

As shown in FIG. 4, the radial nose 38 and the retaining nose 40 are identical in shape. In the assembled condition, they are adjacent by their surface. If possible, they are joined together by their surfaces. The radial nose 38 rigidifies the retaining nose 40. Together, the radial nose 38 and the retaining nose 40 form the retaining sides 41, 42.

As shown in FIG. 5, the first circular blank plate 31, at its outer edge, abuts side faces of a step of the retaining means 36 and of a step of the second circular blank plate 32. The position of the two circular blank plates 31, 32 in the radial plane is substantially effected by the axis of rotation 26. The retaining means 36 is provided in particular for axially keeping together the two circular blank plates 31, 32.

FIG. 4 shows in dash-dot line an outward protruding radial finger 58 that is provided on the second circular blank plate 32. As shown in FIG. 4, it protrudes in the direction opposite the retaining nose 40; it is significantly smaller than said radial nose. Limit stops are provided for this finger 58 on the first hinge arm 21 (not shown); they limit the possible angle of pivotal motion between the two circular blank plates 31, 32.

In the implementation shown in FIG. 6, the second circular blank plate 32 has a retaining bight 39 that is limited and defined by two opposite retaining sides 41, 42. It is a cinematic reversal of the retaining nose 40 shown in FIG. 5. The retaining means 36, which is not shown in FIG. 6, has a mating bight.

On the second hinge arm 22, there is formed a releasable retaining device 46 that will be discussed herein after. It cooperates with the retaining sides 41, 42.

As shown in FIGS. 1 and 2, this retaining device 46 comprises a limit stop 48 that is configured here in the shape of a pin and that is solidly connected to the second hinge arm 22. In the illustration shown in FIG. 1, it abuts the first retaining side 41. In the illustration shown in FIG. 2, it is clearly spaced from this retaining side 41, the distance also corresponding to the angle of pivotal motion of the seat back.

In the illustration shown in FIG. 1, the second retaining side 42 is in contact with a stopper arm 50 of the retaining device 46. It cooperates with a control arm 52 that is also disposed for pivotal motion on the second hinge arm 22. It may be actuated using a Bowden cable 54 that is connected to a release lever 56 and that is provided in a known way on the seat back 30.

What is claimed is:

1. A hinged mounting for a seat back hinge of a motor vehicle seat, comprising: a first hinge arm, a second hinge arm, and a circular blank interposed between said first hinge arm and said second hinge arm, said circular blank comprising (a) a first circular blank plate that is connected to said first hinge arm, (b) a second circular blank plate that is associated with said second hinge arm, (c) a retaining means for keeping the two circular blank plates together in the axial direction, and (d) a releasable stopper device that is interposed between said two circular blank plates and said two hinge arms, being pivotal relative to each other about an axis of rotation and said second circular blank plate comprising at least one retaining side,
    wherein said retaining means is rigidly connected to said second circular blank plate and comprises an annular region and a radial nose;
    between said annular region and said second circular blank plate there is formed a circumferential groove in which there is located the first circular blank plate and in which said first circular blank plate is retained for rotation; and
    said radial nose rests with its surface on the at least one retaining side, is rigidly connected thereto, and stiffens it.

2. The hinged mounting as defined in claim 1, wherein the at least one retaining side is one of: (a) a portion of a retaining nose projecting radially outward that is provided on the second circular blank plate and further comprises a portion of a radially outward projecting nose provided on the retaining means; and (b) a portion of a retaining bight that is provided in the second circular blank plate and is a portion of a bight that is provided on the retaining means.

3. The hinged mounting as defined in claim 2, wherein the retaining nose and the radial nose form the at least one retaining side.

4. The hinged mounting as defined in claim 1, wherein the at least one retaining side comprises two retaining sides facing each other in opposite directions.

5. The hinged mounting as defined in claim 1, wherein a retaining limit stop cooperating with the at least one retaining side is provided on the second hinge arm.

6. A hinged mounting for a seat back hinge of a motor vehicle seat, comprising: a first hinge arm, a second hinge arm, and a circular blank interposed between said first hinge arm and said second hinge arm, said circular blank comprising (a) a first circular blank plate that is connected to said first hinge arm, (b) a second circular blank plate that is associated with said second hinge arm, (c) a retaining means for keeping the two circular blank plates together in the axial direction, and (d) a releasable stopper device that is interposed between said two circular blank plates and said two hinge arms, being pivotal relative to each other about an axis of rotation and said second circular blank plate comprising at least one retaining side,
    wherein said retaining means is rigidly connected to said second circular blank plate and comprises an annular region and a radial nose;
    between said annular region and said second circular blank plate there is formed a circumferential groove in which there is located the first circular blank plate and in which said first circular blank plate is retained for rotation;
    said radial nose rests with its surface on the at least one retaining side, is rigidly connected thereto, and stiffens it;
    wherein the at least one retaining side is a portion of a retaining nose projecting radially outward that is provided on the second circular blank plate and further comprises a portion of a radially outward projecting nose provided on the retaining means, and
    wherein the radial nose has the same shape as the retaining nose.

7. The hinged mounting as defined in claim 1, wherein the first circular blank plate and the second circular blank plate are made from a material having the same thickness.

8. The hinged mounting as defined in claim 1, wherein the second circular blank plate is made from a material that is about twenty percent to about eighty percent thicker than the material of the retaining means.

9. A hinged mounting for a seat back hinge of a motor vehicle seat, comprising: a first hinge arm, a second hinge arm, and a circular blank interposed between said first hinge arm and said second hinge arm, said circular blank comprising (a) a first circular blank plate that is connected to said first hinge arm, (b) a second circular blank plate that is associated with said second hinge arm, (c) a retaining means for keeping the two circular blank plates together in the axial direction, and (d) a releasable stopper device that is interposed between said two circular blank plates and said two hinge arms, being pivotal relative to each other about an axis of rotation and said second circular blank plate comprising a retaining nose,
    wherein said retaining means is rigidly connected to said second circular blank plate and comprises an annular region and a radial nose;
    between said annular region and said second circular blank plate there is formed a circumferential groove in which there is located the first circular blank plate and in which said first circular blank plate is retained for rotation; and
    said radial nose rests with its surface on said retaining nose, is rigidly connected thereto, and stiffens it.

* * * * *